(12) United States Patent
Bermudez Rodriguez et al.

(10) Patent No.: US 10,372,705 B2
(45) Date of Patent: Aug. 6, 2019

(54) PARALLEL QUERYING OF ADJUSTABLE RESOLUTION GEOSPATIAL DATABASE

(71) Applicant: International Business Machines Corporation, Armonk, NY (US)

(72) Inventors: Sergio A. Bermudez Rodriguez, Boston, MA (US); Marcus O. Freitag, Sleepy Hollow, NY (US); Hendrik F. Hamann, Yorktown Heights, NY (US); Levente Klein, Tuckahoe, NY (US); Fernando J. Marianno, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 15/096,218

(22) Filed: Apr. 11, 2016

(65) Prior Publication Data

US 2017/0011089 A1 Jan. 12, 2017

Related U.S. Application Data

(60) Provisional application No. 62/189,256, filed on Jul. 7, 2015.

(51) Int. Cl.
*G06F 16/29* (2019.01)
*G06F 16/2453* (2019.01)
*G06F 16/9537* (2019.01)

(52) U.S. Cl.
CPC ........ *G06F 16/24532* (2019.01); *G06F 16/29* (2019.01); *G06F 16/9537* (2019.01)

(58) Field of Classification Search
CPC .................................................. G06F 17/30247
See application file for complete search history.

(56) References Cited

U.S. PATENT DOCUMENTS

| | | | | |
|---|---|---|---|---|
| 7,965,902 B1* | 6/2011 | Zelinka | ................... | G06T 17/05 382/284 |
| 2004/0225665 A1* | 11/2004 | Toyama | ................... | G06F 16/29 |
| 2005/0206657 A1* | 9/2005 | Arcas | ..................... | G01C 21/36 345/660 |
| 2005/0270288 A1* | 12/2005 | Arcas | ................. | G06K 9/00476 345/428 |
| 2009/0287702 A1* | 11/2009 | Pascucci | ................. | G06F 16/51 |
| 2011/0055290 A1* | 3/2011 | Li | ............................ | G06F 16/29 707/807 |

(Continued)

*Primary Examiner* — Apu M Mofiz
*Assistant Examiner* — Farhad Agharahimi
(74) *Attorney, Agent, or Firm* — Daniel P. Morris; Otterstedt, Wallace & Kammer, LLP

(57) ABSTRACT

An embodiment includes dividing a map into a first grid comprising a first plurality of cells with a first resolution and into a second grid comprising a second plurality of cells with a second resolution; determining that, because an initial portion of a key of a first cell of the second grid comprises a key of a first cell of the first grid, the first cell of the first grid comprises the first cell of the second grid; storing the first and the second grid in memories of distributed servers, wherein the first cell of the first grid and the first cell of the second grid are stored in a same one of the distributed servers or are stored in neighboring ones of the distributed servers; and directing respective processors of the distributed servers to perform a parallel search of the first grid and the second grid using the keys.

24 Claims, 13 Drawing Sheets

(56) References Cited

U.S. PATENT DOCUMENTS

2011/0128288 A1* 6/2011 Petrou ................ G06K 9/00664
                                                    345/428
2016/0379388 A1* 12/2016 Rasco ..................... G06F 16/29
                                                    715/753

* cited by examiner

| Resolution layers (n) | Δθ, Δφ [degree] | Δy [km] Δx [km] (φ=0°) | Δx [km] (φ=40°) |
|---|---|---|---|
| 1 | 0.000008 | 0.00089 | 0.00067 |
| 2 | 0.000016 | 0.00178 | 0.00134 |
| 3 | 0.000032 | 0.00356 | 0.00268 |
| 4 | 0.000064 | 0.00712 | 0.00536 |
| 5 | 0.000128 | 0.01424 | 0.01072 |
| 6 | 0.000256 | 0.02848 | 0.02144 |
| ... | | | |
| 9 | 0.002048 | 0.22786 | 0.17152 |
| ... | | | |
| 26 | 268.435465 | 29863.444 | 22481.469 |

FIG.3B

| RI 410 | dDegree 420 | dxCell@0 (km) 430 | dxCell@20(km) 432 | dxCell@40(km) 434 | dxCell@60(km) 436 | dyCell (km) 440 | Nx 450 | Ny 460 | Bits 470 | DataSets 480 |
|---|---|---|---|---|---|---|---|---|---|---|
| 26 | 0.00001 | 0.00111 | 0.00094 | 0.00078 | 0.00065 | 0.00111 | 33554432 | 33554432 | 50 | |
| 25 | 0.00002 | 0.00222 | 0.00188 | 0.00156 | 0.00129 | 0.00222 | 16777216 | 16777216 | 48 | |
| 24 | 0.00004 | 0.00445 | 0.00375 | 0.00311 | 0.00258 | 0.00445 | 8388608 | 8388608 | 46 | |
| 23 | 0.00008 | 0.00889 | 0.00751 | 0.00622 | 0.00516 | 0.00889 | 4194304 | 4194304 | 44 | Soil, Elevation |
| 22 | 0.00016 | 0.01778 | 0.01502 | 0.01244 | 0.01032 | 0.01778 | 2097152 | 2097152 | 42 | |
| 21 | 0.00032 | 0.03556 | 0.03003 | 0.02488 | 0.02064 | 0.03556 | 1048576 | 1048576 | 40 | LandSat, Crop |
| 20 | 0.00064 | 0.07112 | 0.06006 | 0.04976 | 0.04128 | 0.07112 | 524288 | 524288 | 38 | |
| 19 | 0.00128 | 0.14225 | 0.12013 | 0.09952 | 0.08257 | 0.14225 | 262144 | 262144 | 36 | |
| 18 | 0.00256 | 0.28450 | 0.24026 | 0.19904 | 0.16513 | 0.28450 | 131072 | 131072 | 34 | MODIS |
| 17 | 0.00512 | 0.56899 | 0.048051 | 0.39808 | 0.33026 | 0.56899 | 65536 | 65536 | 32 | |
| 16 | 0.01024 | 1.13799 | 0.96103 | 0.79616 | 0.66052 | 1.13799 | 32768 | 32768 | 30 | GOES, MODIS |
| 15 | 0.02048 | 2.27598 | 1.92205 | 1.59232 | 1.32106 | 2.27598 | 16384 | 16384 | 28 | Weather |
| 14 | 0.04096 | 4.55195 | 3.84410 | 3.18465 | 2.64209 | 4.55195 | 8192 | 8192 | 26 | |
| 13 | 0.08192 | 9.10391 | 7.68820 | 6.36929 | 5.28419 | 9.10391 | 4096 | 4096 | 24 | |
| 12 | 0.16384 | 18.20781 | 15.37641 | 12.73858 | 10.56837 | 18.20781 | 2048 | 2048 | 22 | |
| 11 | 0.32768 | 36.41562 | 30.75281 | 25.47717 | 21.13674 | 36.41562 | 1024 | 1024 | 20 | |
| 10 | 0.65536 | 72.83124 | 61.50563 | 50.95434 | 42.27348 | 72.83124 | 512 | 512 | 18 | |
| 9 | 1.31072 | 145.66249 | 123.01125 | 101.90868 | 84.54697 | 145.66249 | 256 | 256 | 16 | |
| 8 | 2.62144 | 291.32497 | 246.02250 | 203.81736 | 169.09394 | 291.32498 | 128 | 128 | 14 | |
| 7 | 5.24288 | 582.64995 | 492.04500 | 407.63472 | 338.18787 | 582.64996 | 64 | 64 | 12 | |
| 6 | 10.48576 | 1165.29989 | 984.09000 | 815.26943 | 676.37575 | 1165.29992 | 32 | 32 | 10 | |
| 5 | 20.97152 | 2330.59979 | 1968.18000 | 1630.53887 | 1352.75150 | 2330.59983 | 16 | 16 | 8 | |
| 4 | 41.94304 | 4661.19958 | 3936.36001 | 3261.07774 | 2705.50300 | 4661.19966 | 8 | 8 | 6 | |
| 3 | 83.88608 | 9322.39915 | 7872.72002 | 6522.15547 | 5411.00599 | 9322.39932 | 4 | 4 | 4 | |
| 2 | 167.77216 | 18644.78931 | 15745.44003 | 13044.31094 | 10822.01198 | 18644.79864 | 2 | 2 | 2 | |
| 1 | | | | | | | | | | |

FIG. 4

PARALLEL QUERYING OF ADJUSTABLE RESOLUTION GEOSPATIAL DATABASE

CROSS-REFERENCE TO RELATED APPLICATIONS

This patent application claims the benefit of U.S. Provisional Patent Application Ser. No. 62/189,256 filed on Jul. 7, 2015, the complete disclosure of which is expressly incorporated herein by reference in its entirety for all purposes.

FIELD OF THE INVENTION

The present invention relates to the electrical, electronic and computer arts, and, more particularly, to geospatial databases and the like.

BACKGROUND OF THE INVENTION

Geospatial programs, e.g. a geographic information system (GIS), can take geographical or spatial datasets that have different projections and resolution and display them as overlapping layers. But performing any type of manipulation or computation on multiple data layers requires time-consuming interpolation and re-projection of the datasets, where perfect alignment requires extraction of bounding box data from a metafile (for each layer) to align different spatial resolution grids, one on the top of others. Furthermore such resulting data will be stored on a hard disk drive or in a relational database, thus making it very difficult to search and reintegrate in subsequent queries. In many cases, the data is undiscoverable and will require extensive preparation before a new query can be performed. Also note that the source/original data for geographical or spatial sets are usually hosted on myriads of databases, where each database has its own query language and data retrieval tools making data integration a very time consuming process.

SUMMARY OF THE INVENTION

Principles of the invention provide techniques for parallel querying of an adjustable resolution and re-projection geospatial database. An illustrative embodiment of the present invention includes receiving at least a first geospatial map at a main server from at least one network; dividing at least a portion of the first map into a first grid comprising a first plurality of cells with a first resolution; dividing at least the portion of the first map into a second grid comprising a second plurality of cells with a second resolution, wherein the second resolution is a multiple of the first resolution; assigning each of the first plurality of cells and the second plurality of cells a unique key using z-order indexing, wherein key length is inversely proportional to resolution such that keys assigned to each of the second plurality of cells are longer than keys assigned to each of the first plurality of cells; determining that, because an initial portion of a key of a first cell of the second grid comprises a key of a first cell of the first grid, the first cell of the first grid comprises the first cell of the second grid; storing the first grid and the second grid in memories of a plurality of distributed servers, wherein the first cell of the first grid and the first cell of the second grid are stored in a same one of the distributed servers or are stored in neighboring ones of the distributed servers; receiving a query at the main server from the at least one network; and the main server directing respective processors of the plurality of distributed servers to perform a parallel search of the first grid and the second grid using the keys for one or more results responsive to the query.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; e.g. faster scanning and querying. For example, embodiments of the present invention can dramatically increase computational speed by using aligned layers to minimize the effort required to extract bounding box data from a metafile. In particular, one or more embodiments of the present invention may provide analytics of re-gridded layers which is 300% faster than analytics of unaligned layers by eliminating the time required for data read in, alignment and processing.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 3A and 3B show resolution-related aspects of longitude and latitude division of the global map, according to an aspect of the invention;

FIG. 4 shows resolution levels in PAIRS, according to an aspect of the invention;

DETAILED DESCRIPTION OF PREFERRED EMBODIMENTS

Figure 1:
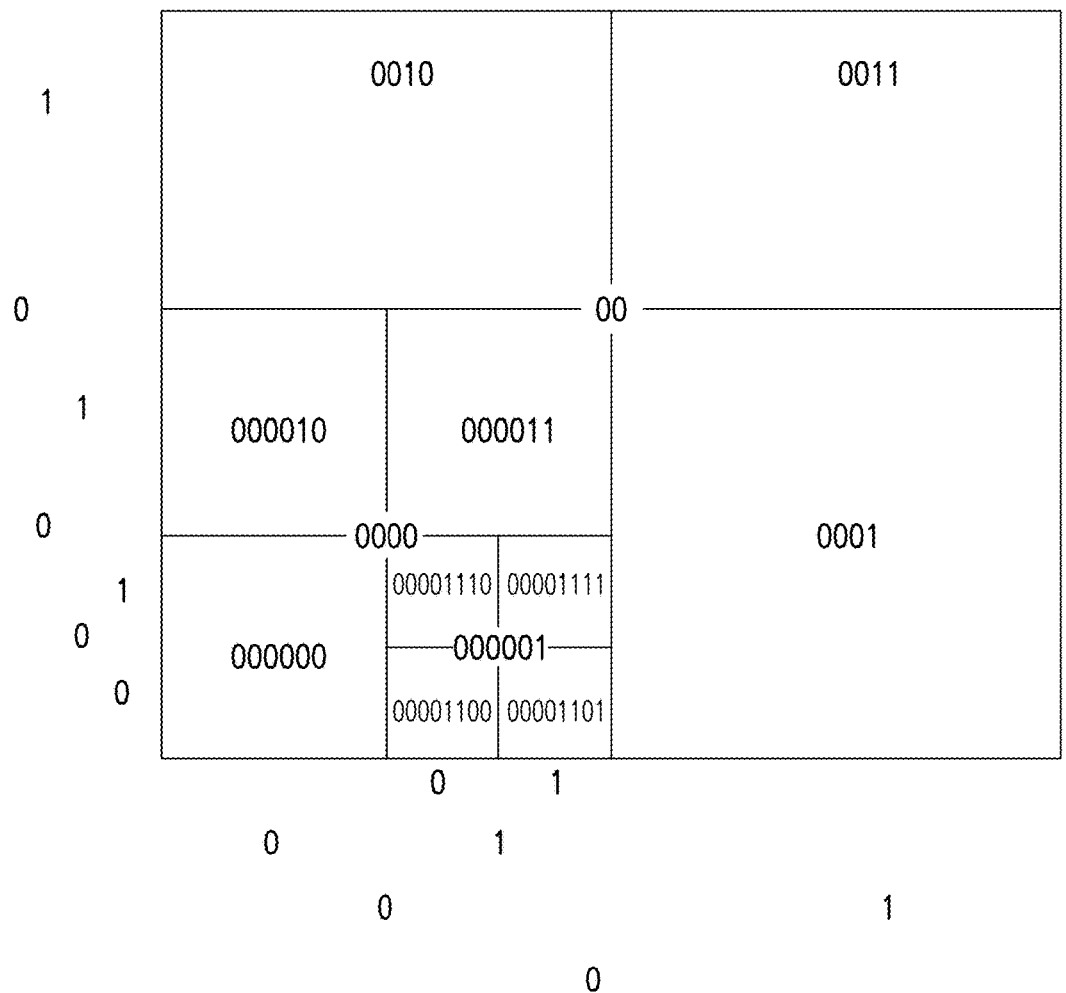
FIG. 1 shows a proposed spatial grid and illustration of the unique key for data indexing, according to an aspect of the invention.

One or more embodiments provide a method to create a generalized geospatial database where geographical or spatial datasets can be stored at rescaled resolution on a given geospatial grid with a preset spatial resolution. The representation of the spatial extent of each data layer is converted to longitude and latitude delineation and placed on a grid where each building block depicts a pixel (whose size in each layer is a multiple of each other pixel size in all the layers) and all the pixels across layers are aligned at the lower left corner (or other predetermined location). Since the grids' resolutions are multiples of each other, all data for a certain location can be retrieved by querying for a single point or a certain area and identifying all layers that have coverage across that area, which is equivalent to looking to the indexes and identifying data layers that share the same keys. Having the resolution of each grid layer be a multiple of each other makes decomposition to higher spatial resolution straightforward: the original cell is sequentially halved, until the desired resolution is reached, while data cells are assigned the same value prefix as the original cell value. The proposed method allows parallel query of data, including for example the following case: multiple locations distributed across a large area can be queried using a set of criteria that crosses multiple data layers and are conditional to given constraints. Data query results can be retrieved in a fraction of time compared with relational databases due to data indexing that places nearby geographical areas close to each other in storage, using alignment of the data layers to index the data layers where the same area shares the same key index, thereby cross-referencing the data layers. Data layers in the same spatial location will share a part of the indexing key, thus enabling fast scans across multiple data layers to retrieve the data that meets the querying criteria. Similar physical data at different spatial resolution may exist in the database, and depending on the analytics to be performed on the data, they can be weighted differently in the final application. The data stored in the proposed geospatial database can be re-gridded to higher or to lower resolution during the query process, where resolution is determined by the analytical applications and adjusted based on the time of query and geographical area.

One or more embodiments provide a method to create a generalized geospatial database. The method is based on re-gridding and aligning any geospatial dataset (whose original source has a given native projection and resolution) in a way that resulting cells sizes are multiple of each other dimensions and are aligned one on the top of each other. The method also encompasses the interpolation of the original data sets to create a continuous layer in the first step and then create a new grid with the desired spatial resolution. The method may require multiple interpolation steps where multiple objectives are pursued: minimize data distortion at edges, maintain physical features integrity like square shape for houses, and minimize the variance of the original signal for a certain area. Each data set will have its own interpolation dependent on the data range, spatial extent and various masks used to cut out parts of the data. The method also includes an adjustable resolution technique and adjustable data interpolation technique for the resulting query outputs.

The data re-gridding aligns the lower left corner of each cell on different layers at locations where the resolution is a multiple value of the lowest spatial grid cell size. These common data points share a common index of the keys and are the key elements that link various data layers spatially. Any two spatial resolution data layers will have a periodic array of common data points that create the link between the layers. FIG. 1 illustrates the proposed grid where the original data gets mapped along with a simplified indexing for each cell. The data indexing allows one to identify any data sets based on the length of the key. Data that share similar key parts can be grouped on the data storage part, reducing the time of query. The method allows one to scan through all data layers and identify those that have a certain key present in the table, thus ensuring data availability in the database. The methods described below allow identifying the number of sub-cells for a given physical layer(s) that are nested in any resolution layer(s) and thus it allows one to improve the time required to run analytics. The method also allows querying the database for large geographical regions, e.g. the US Midwest, that meet all the (sample) criteria: All farms that are between 400 acres and 800 acres, having sandy soil, precipitation from March until October being between 5 inches and less than 10 inches and having planted corn. This (sample) query will require to geospatially inquire 5 data layers and analyze each pixel size based on the requirements while minimizing the areas that may be not identified as a certain crop-corn in this scenario. One such example is the identification of crops based on vegetation index determined from Landsat (project for acquisition of satellite imagery of Earth jointly administered by the U.S. Geological Survey (USGS) and National Aeronautics and Space Administration (NASA)) and MODIS (NASA's Moderate-resolution Imaging Spectroradiometer instrument) data that have 30 m and 250 m resolutions, respectively.

The two layers from Landsat (30 m spatial resolution) and MODIS (250 m spatial resolution) cannot be perfectly aligned across all their cells and there is a 10 m swath that needs to be trimmed in existing approaches. In a common approach the 10 m swath that cannot be overlapped with MODIS data will be discarded. An alternative approach proposed here is to use two different spatial resolution layer that are close to the original resolution: for Landsat the resolution would be 35.56 m and for Modis would be 284.5 m The interpolation and re-gridding process, will change the accuracy of the Landsat data by less than 5%.

Figure 2:
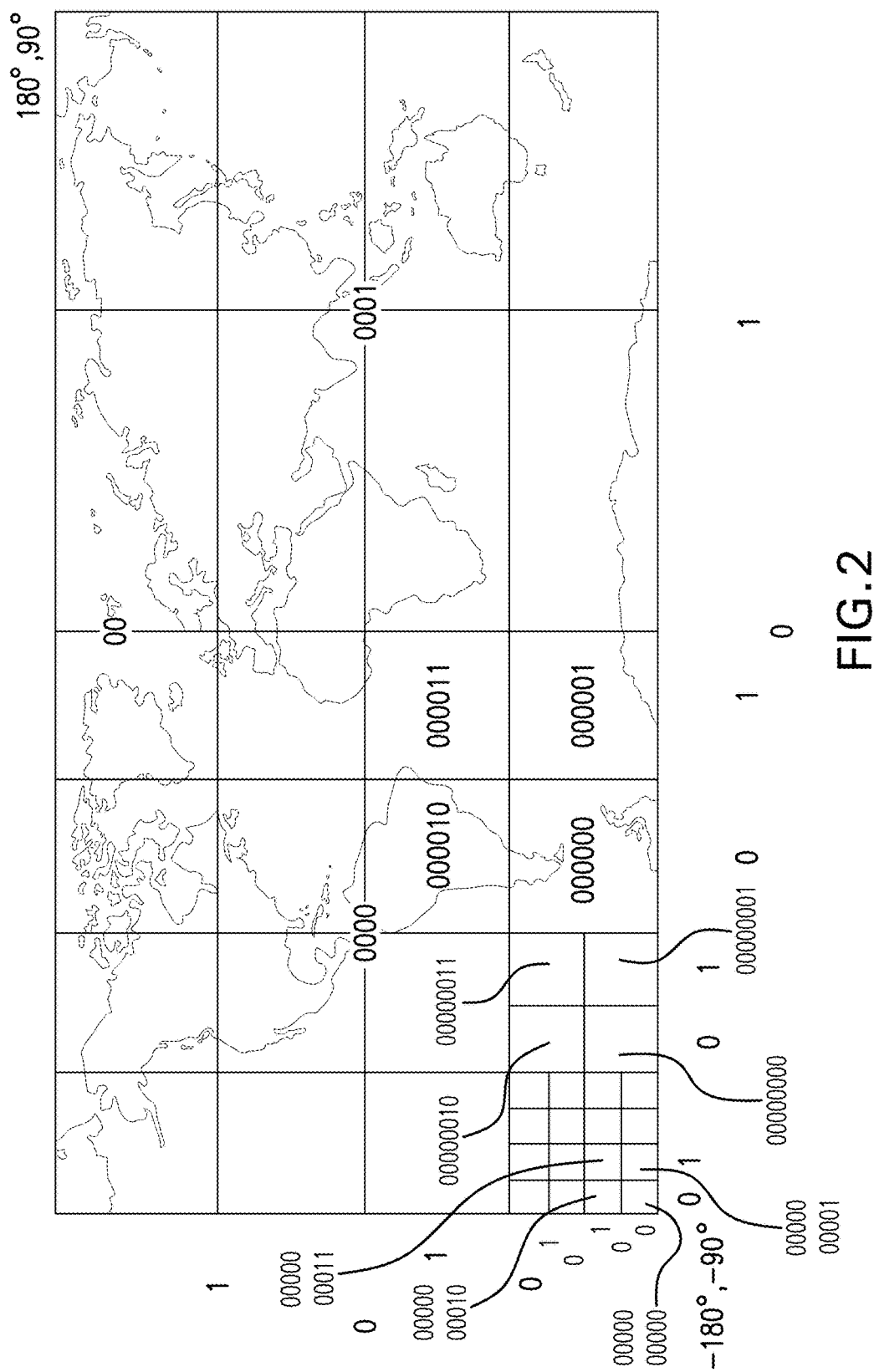
FIG. 2 shows another spatial grid and illustration of the unique key for data indexing, according to an aspect of the invention.

To have a consistent reference system, one or more embodiments divide the global map in a Longitude and Latitude cell grid. Each cell is indexed with a unique ID that is a combination of the indexes on x axis and y axis, as illustrated in FIGS. 1 and 2. A certain location is found by analyzing the longitude and latitude for a certain location. By way of example a longitude of 43 degree means that the globe in the first stage is divided in two and since the value is 43 it will be in the first half that is between 0 to 90 degrees. In the second step the 90 is divided again in two and it is established that it would be in the first half that is between 0 to 45 degrees. Now the 0 to 45 degree quadrant is divided in two and the longitude will be in the second half between 22.5 and 45 degree. The division will go on until the quadrant that contain the 43 degree is established. In this embodiment, at each level, a cell is divided into four quadrants (with four being the square of two), and two additional bits are added to the index. Thus, in this embodiment, the resolution is always a power of 2, as shown at least in FIGS. 1, 2 and 4.

FIG. 2 shows a scheme for indexing every point on the surface of the earth. The four quadrants are lower left 0,0; upper left 0,1; lower right 1,0; and upper right 1,1. Each quadrant can then be split into four pieces, and so on. More particularly, the entire square is "00," the lower left quadrant is 0000, the upper left quadrant is 0010, the lower right quadrant is 0001, and the upper right quadrant is 0011; 00 prepended to each of the four quadrants just discussed. The first and third digits come from the vertical axis and the second and fourth digits are associated with the horizontal axis. These keys or codes are directly associated with longitude and latitude; any longitude and latitude can be converted into a string of (binary) digits (bits) in accordance with the scheme. The number of bits in the index (key) implies a certain spatial resolution; the more bits, the finer the resolution. The index for each data point will be the spatial component that encodes the longitude and latitude. Each data point may also contain a time stamp associated with data layer creation or acquisition, which be formatted using the UNIX® time system which counts the seconds since Jan. 1, 1970. UNIX® is a registered trademark of The Open Group. For a certain area where the spatial component is not changing, the system can scan for all the available time stamps for one single data layers or for all data layers that have a data value in that area. This method of indexing the data using a combination of spatial and temporal components allow for identification of all data layers that have data in a certain area and all the timestamps when data was acquired. Scanning through all the data layers at different moments of time is simplified by the common part of the key that share the same index.

FIG. 2 also includes a coordinate system ranging from (−180°, 180°) for longitudes and (−90°, 90°) for latitude in a manner similar to World Geodetic System (WGS) 84, which is currently used by Global Positioning System (GPS). FIG. 1 shows the breakdown without the world map and WGS 84 coordinate system superimposed. The map is successively divided in half until the longitude or the latitude of a data point is localized within one of the cells. The size of the cells is directly related to the resolution level of the table as shown in FIG. 3B.

Figure 3A:
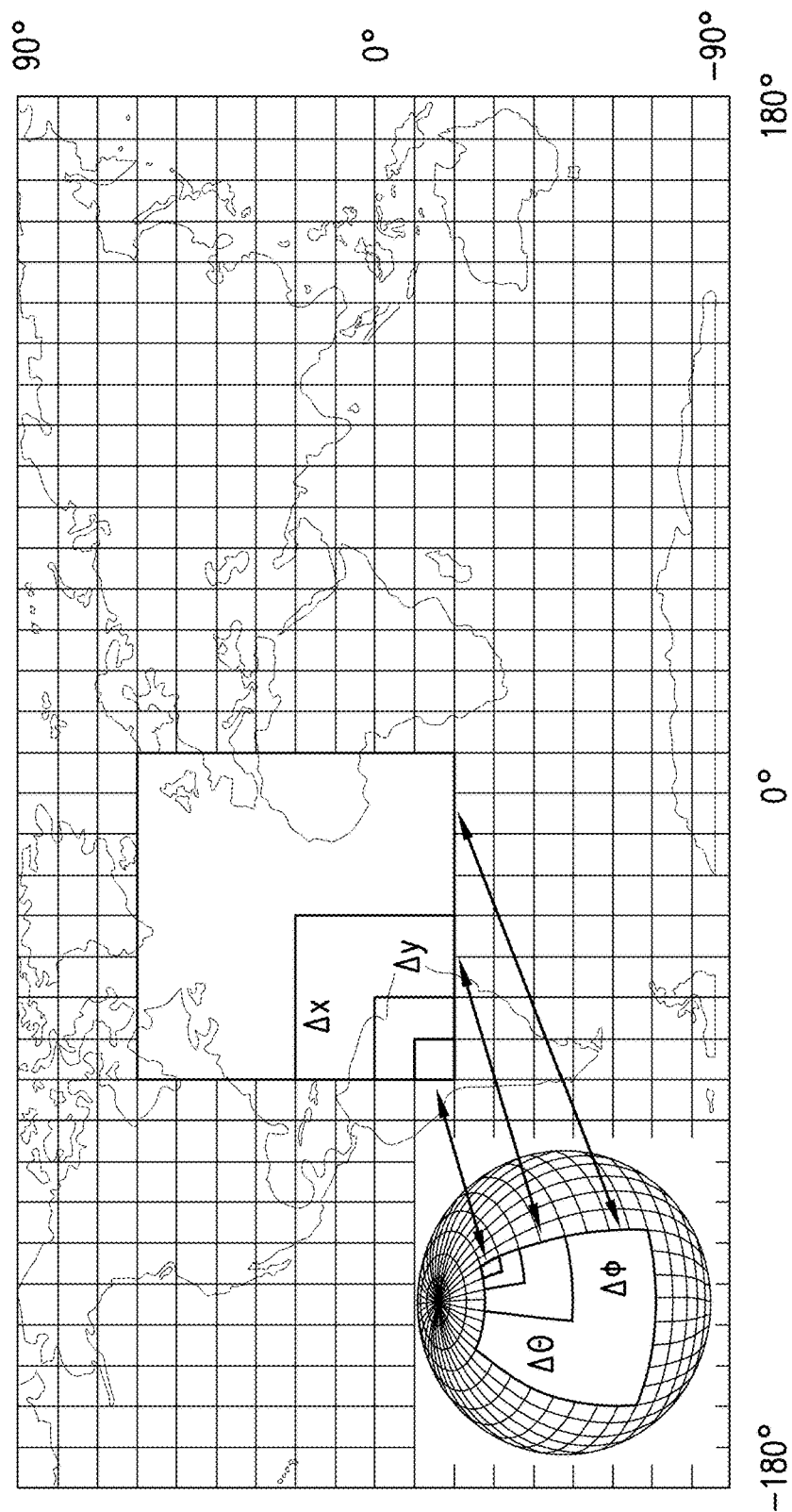

FIG. 3A shows an exemplary projection technique which can be used for generating a two-dimensional grid representative of a substantial spherical object, such as Earth. Specifically, FIG. 3A illustrates a projection technique known as EPSG:4236 which is based on WGS 84, the coordinate system discussed with reference to FIG. 2.

FIG. 3B shows numeric values associated with an embodiment of the projection technique shown in FIG. 3A for different index values or resolution layers. The first column of FIG. 3B shows the index value (number of resolution layers) for the remaining values in that row of FIG. 3B. The second column of FIG. 3B shows the number of degrees subtended by cells, with θ and Φ respectively representing longitude and latitude. The third column of FIG. 3B shows corresponding x (latitude) distances (Δx in km) and the corresponding y (longitude) distances (Δy in km) at the equator, where Φ=0° latitude. The fourth and final column of FIG. 3B shows corresponding x (latitude) distances (Δx in km) where Φ=40° latitude.

The resolution levels used in an exemplary embodiment are shown in FIG. 4. Having these predefined levels allows exemplary embodiments to provide good or even perfect alignment of all the available dataset layers. Column 410 of FIG. 4 shows the resolution index (RI) for the remaining values in that row of FIG. 4. Column 420 of FIG. 4 shows the number of degrees subtended by cells (dDegree). Column 430 of FIG. 4 shows the corresponding longitude (x) distances at the equator, with 0° latitude (dxCell@0). Column 432 of FIG. 4 shows the corresponding longitude (x) distances at 20° latitude (dxCell@20). Column 434 of FIG. 4 shows the corresponding longitude (x) distances at 40° latitude (dxCell@40). Column 436 of FIG. 4 shows the corresponding longitude (x) distances at 60° latitude (dxCell@60). Column 440 of FIG. 4 shows the corresponding latitude (y) distances. Column 450 of FIG. 4 shows the number of longitude (x) cells, and column 460 of FIG. 4 shows the number of latitude (y) cells: columns 450 and 460 collectively define the resolution. Column 470 shows the number of index bits required to specify a cell at the resolution defined by columns 450 and 460. Column 480 provides exemplary applications for which a given resolution may be useful.

The values in FIG. 4 illustrate several properties associated with an exemplary embodiment of the invention. The size of the index (470) is always an even number, while the resolution (450 and 460) is always a power of 2. In this embodiment, Nx 450 and Ny 460 are both equal to 2 raised to an exponent equal to one-half of the index size. The resolution (Nx 450 and Ny 460) increases exponentially, while the size of the index (470) increases logarithmically. In this embodiment, each time the resolution index (RI 410) is incremented by 1, Nx 450 and Ny 460 are each multiplied by 2, while the index size (470) is only incremented by 2.

As shown in column 480 of FIG. 4, different resolutions may be suitable for different applications or continuous change in resolution may be desired. In the current implementation a larger size cells is subdivided in smaller cells and each of the smaller cells will have a data associated that is the value of the original cell. Since the various grids are aligned, no interpolation are necessary when new values are assigned to the new grid cells. For example, weather applications may require data having a resolution somewhat below those offered by MODIS and GOES (Geostationary Operational Environmental Satellite system operated by the U.S. National Environmental Satellite, Data, and Information Service (NESDIS)). By contrast, crop applications may require data having significantly higher resolutions, such as those available by Landsat, while applications involving soil or elevation may require still higher resolutions.

Adjustable Resolution and Selection Method

Figure 5:
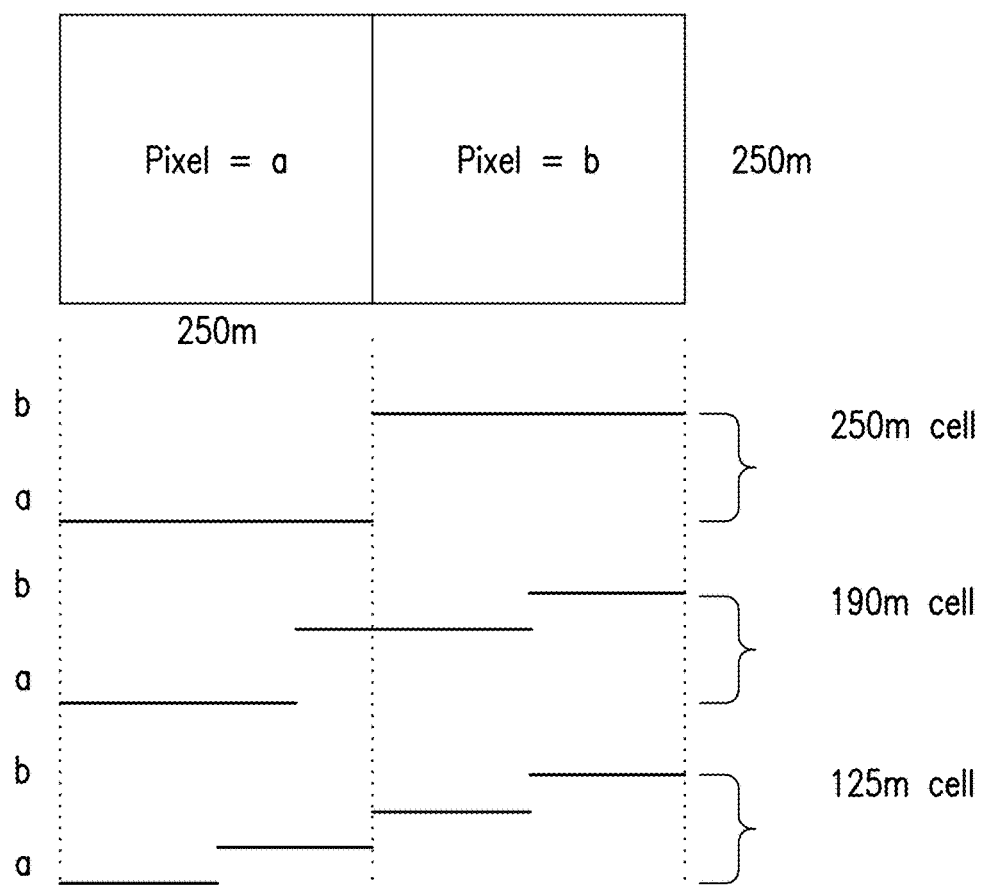
FIG. 5 shows adjustable resolution sample for data, according to an aspect of the invention.

Different data layers come with different resolutions, for example Landsat has 30 m while MODIS has 250 m per pixel. One or more embodiments provide adjustable resolutions at the query stage, which has the benefit of supplying enhanced and even optimal resolution based on the application. For example, consider two MODIS tiles, each with a 250 m resolution, as depicted in FIG. 5. Assume that one pixel has a value of a while the other has value of b, with b>a. By querying the original source data, a large transition will occur at the border of both pixels, but by adjusting the resolution provided by the query to smaller cells, then smaller transitions will be obtained. FIG. 5 shows two such sample resolutions, one with 190 m and the other with 125 m. This reduction in transitions between pixels can provide a more accurate representation of the real life values modeled by the pixels. So, depending on the application, e.g.

delineating farms, one or more embodiments provide better data than the original source images. The resolution selection can be performed at the time of query or be provided by design, e.g. for different use cases the resolution is preselected.

Adjustable Interpolation Method

Figure 6:
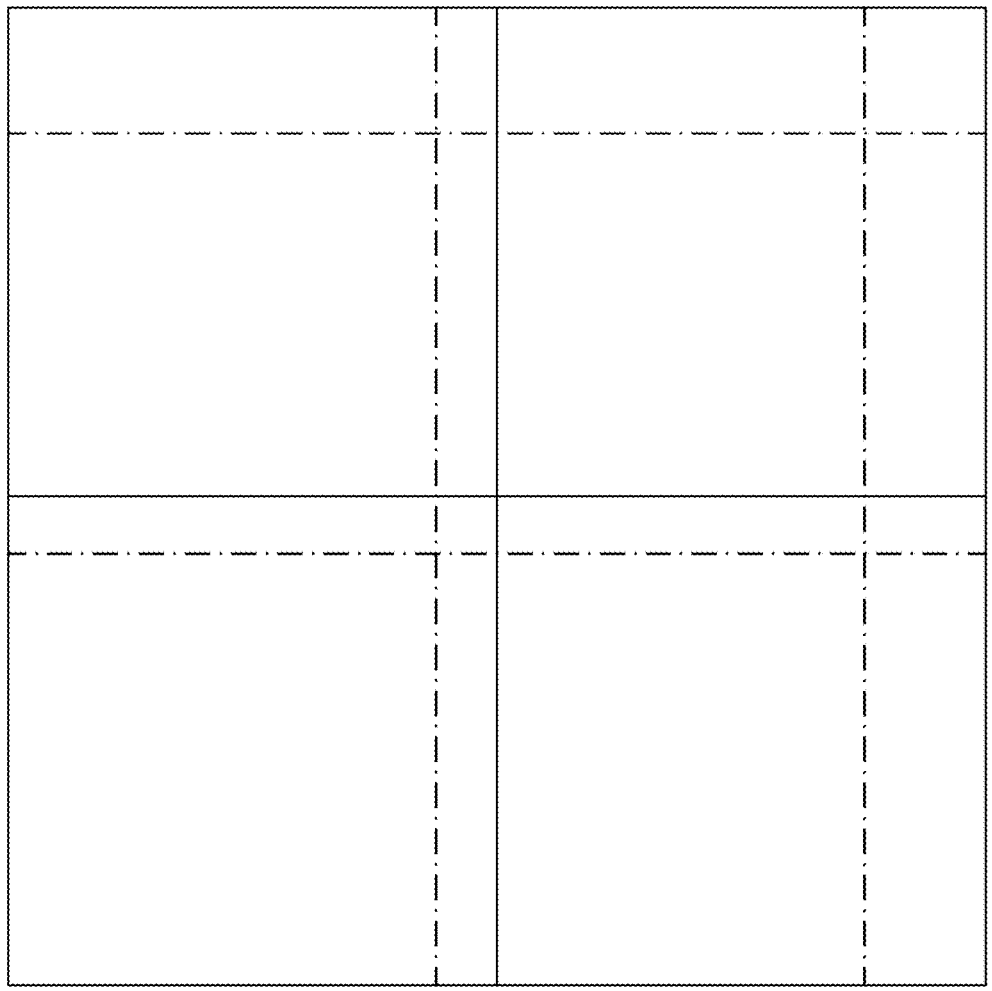
FIG. 6 shows illustration of different grid sizes, according to an aspect of the invention.

Depending on the original cell size, different data set layers cannot be perfectly aligned across all their cells, thus resulting in swaths that need to be considered, as illustrated in FIG. 6. Thus, when adjusting the data with different resolutions other than the one provided by the original source image, then an interpolation may have to be performed. One or more embodiments provide a way to optimally adjust the resulting cell size and swaths pixel values based on different interpolation techniques. An exemplary method has adjustable interpolation based on the original type of the data. Given a particular type of data and application, an optimal interpolation can be selected, where it will be optimal in the sense of providing the most value based on the final use case. For example, cubic interpolation (as opposed to linear, bi-linear, or nearest-neighbors interpolation) may be the best option for crop images, while bilinear interpolation may be more appropriate for weather datasets.

Figure 7A:
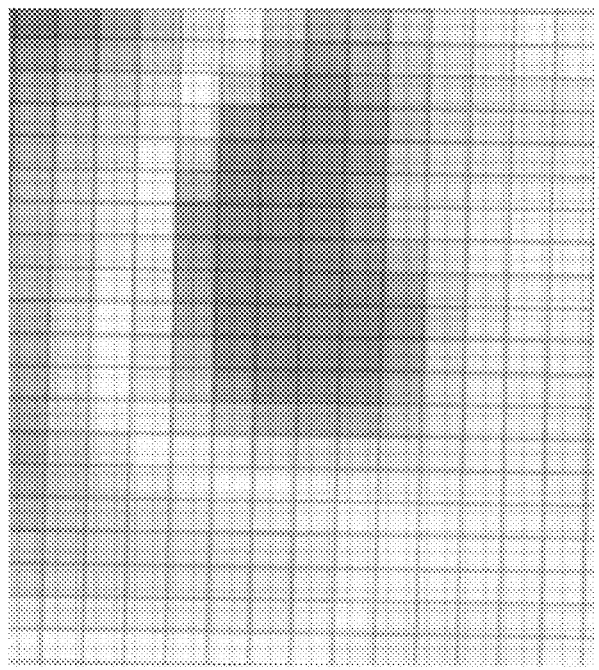
FIGS. 7A and 7B show examples of two interpolation and resolution levels resulting from an exemplary method, according to an aspect of the invention.
Figure 7B:
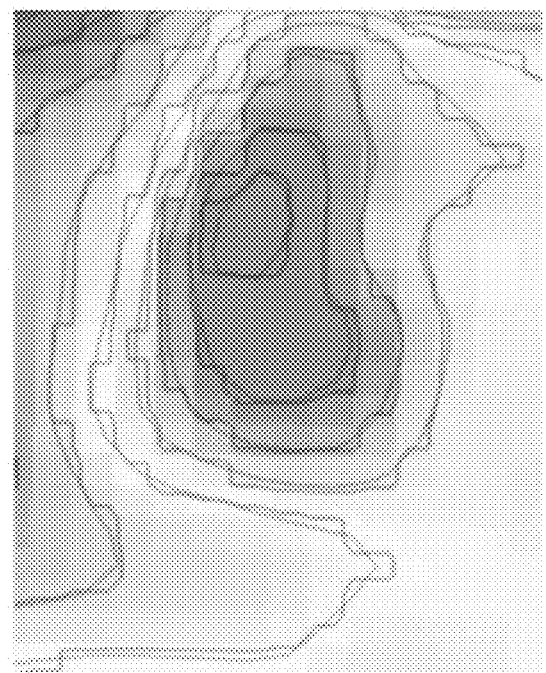

Considering both adjustable interpolation and resolution methods, FIG. 7 provides a sample of the resulting grid and contours for two different resolutions. The top figure shows two grids overlaying a region of a Landsat image. The bottom figure illustrates two different contours resulting from different interpolation levels.

Pertinent Concepts

In one or more embodiments, a database contains multiple geospatially referenced data layers (e.g. satellite data at different spectral bands, weather station, crop, soil, and elevation data, etc.) at native resolution. The database also contains such data layers re-projected at resolutions that are multiples of each other and at a common coordinate system. The re-projection methods can be any suitable ones; the system contains sets of well aligned pixels. Each data layer has one or more physical data layer in it. A parallel querying algorithm retrieves all the relevant data sets from the multiple layers, based on the application. The data fetched are the ones contained, intersecting, or crossing the query boundary. The database returns the data sets at spatial resolutions and time intervals that are adjusted for each application. The system can be queried in multiple locations and the retrieved data layers can be defined by a user or can be retrieved from previous applications that are similar to actual query. Real-time (online) analytics can be used to post-process each relevant data sets resulting from the query. The application may specify the resolution that is required for gridding. If a certain resolution is not available, the highest available resolution data sets are interpolated and re-gridded.

Optimal Resolution Selection: the query output spatial resolution can be at the native resolution or any other resolution to obtain the best possible outcome.

Machine Learning Data Blending Method: data sets describing the same physical properties (e.g. weather) and coming from different original datasets (e.g. numerical weather models and interpolation from weather station data) can be combined and aggregated, e.g. with different weights or other algorithms, to provide the best data for a given application.

Multiple areas from different locations or overlapping areas can be searched in parallel and the data can be retrieved at different resolution based on the importance of each data layers. The importance of one resolution versus another is determined by their weight based on the application Cognitive Data Set Selection: a set of use cases provide the basic core of the application space (e.g. crop yield prediction), where each use case contains defined data sets to be used. For additional applications, not included in the basic core, a cognitive algorithm can help selecting the most useful data sets for the new application, including their spatial resolution.

Application Spaces

Agriculture: Extracting values of the vegetation index from different satellites that have different spatial resolution and acquired at different moment of time. The vegetation index like NDVI (normalized difference vegetation index) data may be needed faster than the typical 16 day revolving time obtained from Landsat and this data can be used to delineate farms, recognize crops, identify and track roads, predict water supply in lakes, estimate evapotranspiration, and/or predict precipitation.

Communications: RF (radio frequency) signal propagation, vegetation signal absorption, RF signal coverage, and/or optimal logistic routing.

Environmental Monitoring: Establishing and validating sites that may emit greenhouse gases like methane and carbon dioxide and could be industrial processing sites and/or exploration sites for gas and/or oil extraction.

Exemplary Method

In one or more embodiments, project the earth on a flat map and divide the map in square cells, called a grid. Square cells are longitude—latitude defined squares. Define a set of grids, each with different resolution. The resolution of the cells of different grids are multiples of each other. The cells of higher resolution align at the lower left corner of the cells of lower resolution. Use a z-order type of indexing for the cells in each grid, where the first digits of the index will be similar for cells laying in the same area and the size of the index is inversely proportional with the index size and cell resolution. The index for each data point will be composed from a combination of longitude and latitude and additionally the time stamp is also included. Use a MapReduce algorithm and Hadoop® system to batch process data and store neighboring data points on the globe on physically close storage areas (for example, when using Apache Hadoop® for distributed storage and distributed processing of very large data sets on computer clusters built from commodity hardware, neighboring data points on the globe are stored on the same or neighboring computers). Hadoop® is a registered trademark of Apache Software Foundation. Data sets can be static maps, time dependent maps, images, time series, videos, etc. In at least some embodiments, all data sets are geotagged. Data can be retrieved as pixels that cross the query area or data can be obtained for points that are closest to locations and contain a time series data. Use one data series to complement other data layer: for example use time series data to complete gridded data when data is missing or can not be retrieved. Create a data layer that has the smallest variance compared with ground truth points or weather stations. Use the weather data to create the best NDVI data layer based on crops, historical NDVI data, and current trends. Validate the data against existing data set that are ground truth.

A skilled artisan will appreciate that MapReduce is a programming model and an associated implementation for processing and generating large data sets with a parallel, distributed algorithm on a cluster. The skilled artisan will also appreciate that Apache Hadoop® is an open-source software framework written in Java for distributed storage and distributed processing of very large data sets on computer clusters built from commodity hardware. Hadoop® was developed for massive amount of data processing, and is based on parallel processing of small chunks of data where the tasks are distributed across multiple processor that result in a speed up of processing. All the modules in Hadoop® are designed with a fundamental assumption that hardware failures (of individual machines, or racks of machines) are commonplace and thus should be automatically handled in software by the framework.

EXAMPLE

Irrigation Maps

Create an NDVI versus time trace for different crops across different geographies and different spatial resolution for the previous 5 years. Create a correlation between NDVI and crop yield. Retrieve all satellite data that are available, closest in time, at all possible spatial resolution; e.g., 30 m, 250 m, 500 m, or 1 km resolution. Determine the best satellite layer that has the lowest cloud cover and is between data stamps of 30 m satellite resolution layer. Combine data layer to artificially create a 30 m data layer that would take coarser resolution data and assign values to the 30 m pixels based on ratio calculated from the 30 m layer (this approach will propagate the vegetation index across time interval when data is not available). Calibrate the data using historical NDVI versus time traces (to follow trends for a certain crop based on historical trends where the weather for current year will match closely the year where the vegetation trends is followed) where the weather conditions were similar—to assure accuracy. Repeat the same steps across different geographies where different data layers are used to create a 30 m NDVI map and using different resolution weather data. Create an irrigation map based on solar radiation, soil properties, vegetation index using remote satellite data at highest resolution.

One or more embodiments seek to create a database in which geospatial data is integrated. In general, geospatial data is obtained at different resolutions and at different projections (projection=how the data is placed on the surface of the earth). Currently, a great deal of time is wasted aligning data sets. In contrast, one or more embodiments process the data set up front and define a well-defined set of grids that are multiples of each other, resolution-wise, increasing by a factor of two. This allows good, and even perfect, alignment of data. This permits speeding up analytics by a factor of about ten. One or more embodiments index all the points in the geospatial data of interest, providing information about the space where the point belongs (longitude and latitude) and a time stamp. The key contains this information. When a query is submitted, it is possibly to quickly go to the location of interest and pull all the datasets with the timestamp(s) of interest.

One or more embodiments allow for increasing or decreasing the spatial resolution in order to accelerate the analytics. Some applications (temperature) can be run with coarse resolution. Others may require a finer resolution; e.g., precipitation.

One or more embodiments employ the Hadoop® open source "big data" platform. The geographic data is distributed differently in different places; e.g., the US has a large number of data sets while other parts of the world such as Africa have fewer data sets. One or more embodiments cluster computational servers with associated hard disks or other persistent storage and distribute datasets uniformly such that it is known where desired data resides. The computations are carried out on the node (server) where the dataset resides. A similar process is carried out in parallel on other computational nodes, and the results are combined (e.g., added up) to a master node which assembles the information and responds to the query.

Furthermore one or more embodiments permit dynamically changing the resolution of the data. For example, consider data "sitting" in the platform at 1 km resolution and it is desired to retrieve it at 5 km resolution—the interpolation is carried out in the node where the data resides. All the nodes do not necessarily need to do the same kinds of computations. Consider a dataset for Kansas at 10 m resolution and in Nevada at 1 km resolution. This is a large mismatch. When the data is stitched together at the master level, there will be larger and smaller tiles depending on the application and the calculations can be run on the different resolution data sets. Consider an analysis of rain levels—a coarse resolution may be appropriate for the Nevada desert, while a fine resolution may be needed for eastern US coastal regions.

Additional Details Regarding Hash Key Design

Figure 8A:
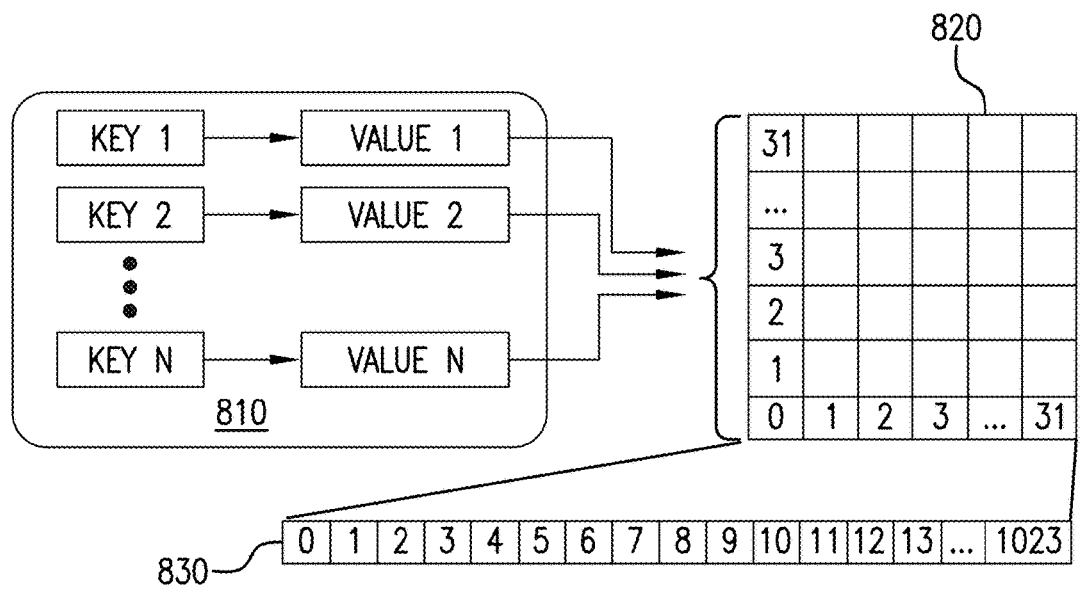
FIGS. 8A and 8B show key-related aspects of the invention.
Figure 8B:
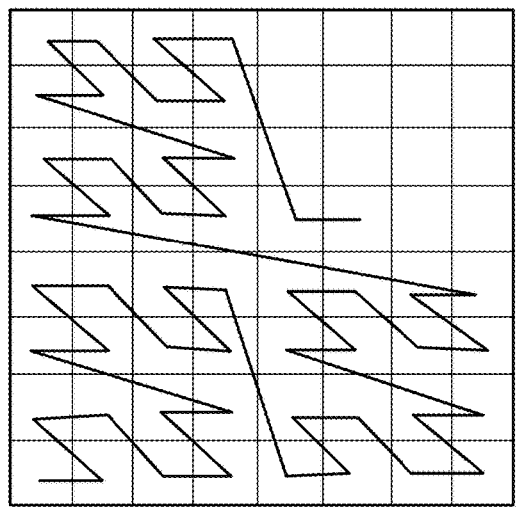

FIGS. 8A and 8B show key-related aspects of the invention. Database 810, which by way of example could be implemented using Apache HBase®, uses a key to uniquely identify, and thereby retrieve, a value, such a specific cell within a grid. A 32 by 32 grid, such as that shown as 820, contains 1024 cells, shown in 830. Illustrative embodiments advantageously use a Morton curve, such as that shown in FIG. 8B, to implement z-order indexing to significantly reduce the size of the index required to uniquely identify a cell within a grid. As discussed above with reference to FIG. 4, an exemplary embodiment would only require an index having a length of 10 bits to uniquely identify any one of the 1024 cells within the 32 by 32 grid shown in FIG. 8A. HBase® is a registered trademark of Apache Software Foundation.

Exemplary Data Processing Methods and Systems

An exemplary disclosed method and system can be presented in a combined block diagram and flow chart that includes its processing and its functionality. Aspects of one or more exemplary embodiments are referred to herein as "PAIRS." The skilled artisan will appreciate that:

The Spring Web model-view-controller (MVC) framework is designed around a DispatcherServlet that dispatches requests to handlers, with configurable handler mappings, view resolution, locale, time zone and theme resolution as well as support for uploading files.

AJAX (asynchronous JavaScript and XML) is a group of interrelated Web development techniques used on the client-side to create asynchronous Web applications. With Ajax, web applications can send data to and retrieve from a server asynchronously (in the background) without interfering with the display and behavior of the existing page.

Representational State Transfer (REST) is a software architecture style consisting of guidelines and best practices for creating scalable web services. Web service APIs that adhere to the REST architectural constraints are called RESTful APIs.

RDBMS is an acronym for relational database management system, as opposed to a non-relational database such as the aforementioned HBase®. An exemplary RDBMS is DB2®, which is a registered trademark of and is commercially available from the assignee of the present invention, International Business Machines (IBM) Corp.

Figure 9:
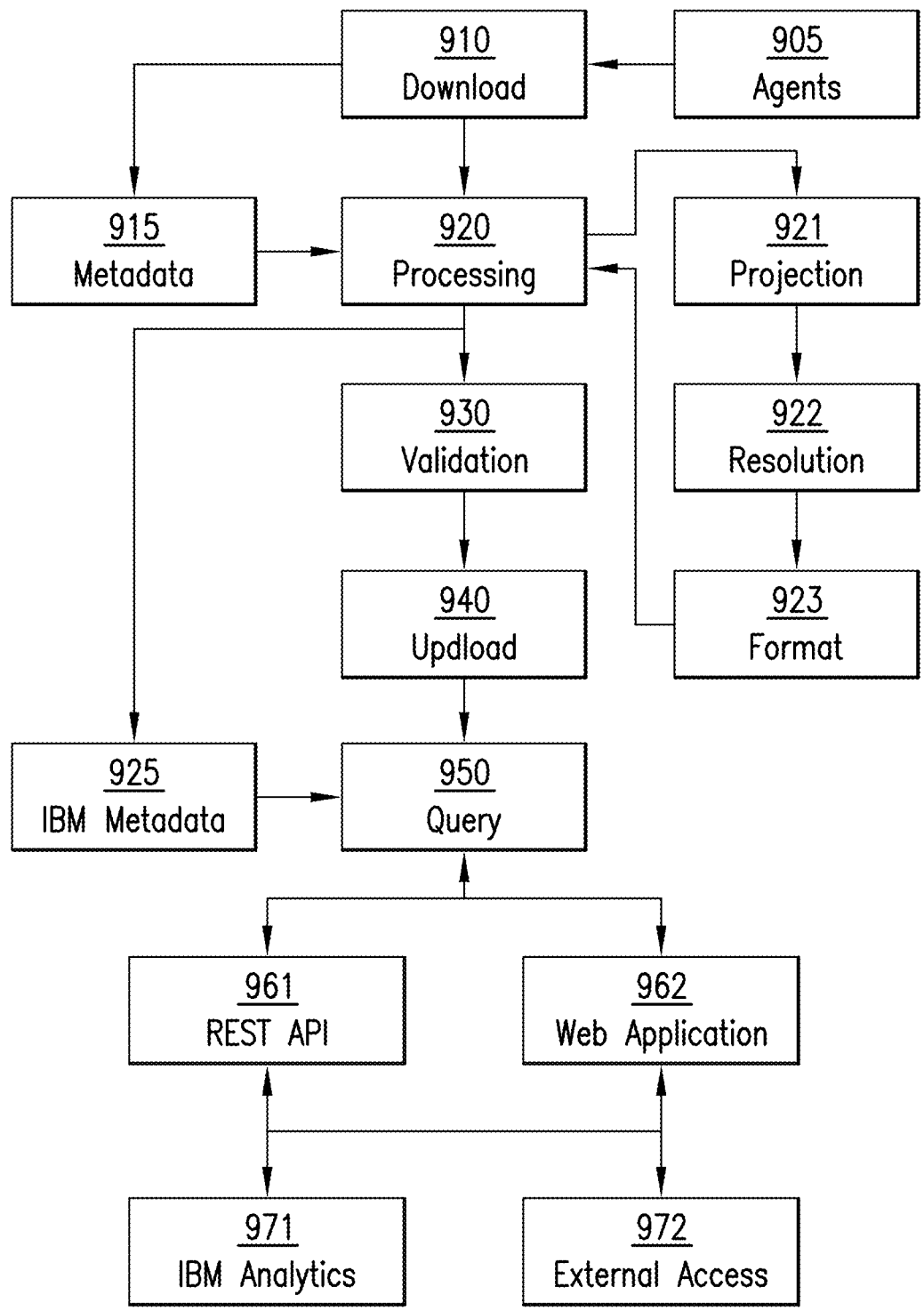
FIG. 9 shows a combined block diagram and flow chart, according to an aspect of the invention.

FIG. 9 shows a combined block diagram and flow chart, according to an aspect of the invention. Source data is retrieved by download 910 along with metadata 915 through software agents 905. The skilled artisan would appreciate that this may entail the use of a network, such as the Internet. Examples of sources which could be used with illustrative embodiments include Landsat and MODIS discussed above. Other sources could include, for example, CIMIS (California Irrigation Management Information System) operated by the California Department of Water Resources (DWR), NED (National Elevation Dataset) available from the USGS, PRISM (Parameter-elevation Regressions on Independent Slopes Model) developed by the Northwest Alliance for Computational Science & Engineering (NACSE) based at Oregon State University and supported by the U.S. Department of Agriculture (USDA) Risk Management Agency, and various weather feeds available from, for example, the National Oceanic and Atmospheric Administration (NOAA).

Processing 920 may include adjusting one or more of projection (e.g., warp) 921, resolution (e.g., virtual raster) 922, and/or format (e.g., translation) 923. Processing 920 may be done sequentially and/or in parallel. An automatic validation process 930 verifies the correctness of the resulting data after processing 920. The verified data is then uploaded 940 into a big data platform, e.g. Hadoop®, along with relevant metadata 945 information created to support the analytics on the data. Query engine 950 can be triggered via an application programming interface (API) 961 and/or via a Web Application 962. API 961 could be, for example, a RESTful API, while Web Application 962 could include, for example, use of Spring MVC and/or AJAX. API 961 and Web Application 962 allow for query engine to be used for analytics 971 and for external access 972. For example, API 961 could be used to access query engine 950 for analytics 971 internally, while web application 962 could be used to access query engine 950 for external access 972. Analytics 971 may include, for example, evapotranspiration, NDVI, precipitation, RF signal propagation, optimal logistical routing, and/or any of the other applications discussed herein. External access 972 can allow for customer access, on a computer (including, but not limited to, a desktop and/or laptop computer) and/or a telecommunications access device (including, but not limited to, a smart phone). External access 972 can also provide aligned layers and variable spatial size to provide an easy way to interact with the data.

Figure 10:
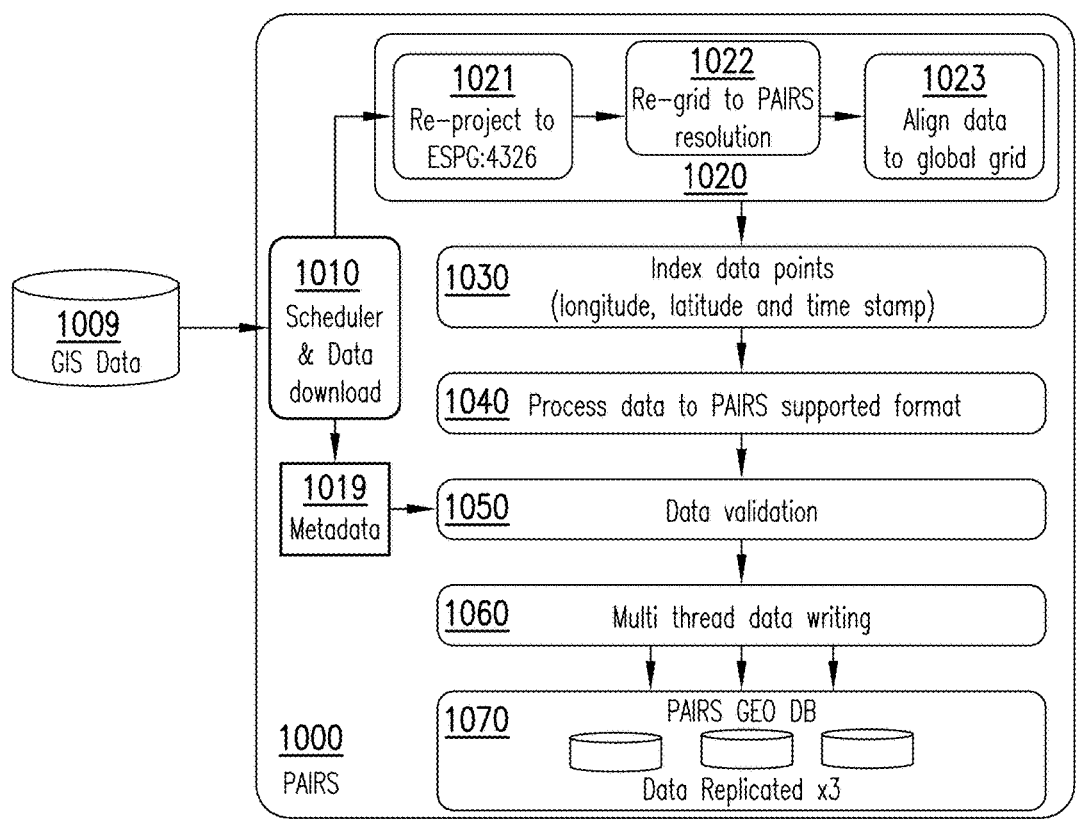
FIG. 10 shows another combined block diagram and flow chart, according to an aspect of the invention.

FIG. 10 shows a combined block diagram and flow chart, according to another aspect of the invention. GIS data 1009, although shown as a single element for simplicity, could include data obtained from multiple sources. These sources could include government agencies such as NASA, USGS, and NOAA, all discussed above, as well as the Census Bureau of the U.S. Department of Commerce, which provides various population and demographic data sets. GIS data 1009 could also include user-generated content obtained from Twitter® or cell-phone camera images. Twitter® is a registered trademark of Twitter, Inc. GIS data 1009 can be in any number of formats well-known to one skilled in the art, a non-exhaustive list of which include: IMG proprietary format by Garmin Ltd.; GeoTIFF (Geographic Tagged Image File Format) by Dr. Niles Ritter et al.; HDF (Hierarchical Data Format) by NCSA (National Center for Supercomputer Applications); NetCDF (Network Common Data Format) by UCAR (University Corporation for Atmospheric Research); BIL (Band Interleaved by Line) and AAIGrid (Arc/Info ASCII Grid) by ESRI (Environmental Systems Research Institute); vector and/or GPS images; text and/or Twitter®.

GIS data 1009 is downloaded into PAIRS 1000 (typically over one or more networks, such as the Internet) by scheduler 1010, which extracts metadata 1019. The remaining data is sent to pre-processing 1020. Pre-processing 1020 commences with re-projection 1021, which preferably applies EPSG:4236 as discussed above with reference to FIG. 3A. Pre-processing 1020 continues with re-gridding 1022, which preferably applies one or more of the resolutions discussed above with reference to FIG. 4. Pre-processing 1020 concludes with alignment 1023, which preferably applies WGS 84 as discussed above with reference to FIG. 2.

After pre-processing 1020, data points are indexed 1030 with longitude, latitude, and time stamp. These data are processed 1040, e.g., translated, into a format supported by PAIRS. Data validation 1050 compares the processed data from 1040 with the metadata 1019 previously extracted by scheduler 1010 from GIS data 1009. After the validation 1050, the data is written 1060, preferably in a multi-threaded and/or parallel manner, into the PAIRS GEO DB 1070, which may be implemented using Hbase®. The data is preferably multiply (e.g., thrice) replicated.

One skilled in the art will appreciate that, although FIGS. 9 and 10 may be conceptualized as distinct embodiments of the present invention, certain elements within each figure may have certain functional similarities with may assist in creating a single implementation which incorporates features from both embodiments. Elements 905 and 910 in FIG. 9 could respectively correspond to elements 1009 and 1010 in FIG. 10. Elements 915 and/or 945 in FIG. 9 could correspond to element 1019 in FIG. 10.

Element 920 in FIG. 9 could correspond to elements 1020, 1030, and/or 1040 in FIG. 10. Specifically, elements 921 and 922 in FIG. 9 could correspond respectively to element 1021 and 1022 in FIG. 10, while element 923 in FIG. 9 could correspond to element 1040 in FIG. 10. Element 930 in FIG. 9 could correspond to element 1050 in FIG. 10. Lastly, element 940 in FIG. 9 could correspond to elements 1060 and/or 1070 in FIG. 10.

Figure 11:
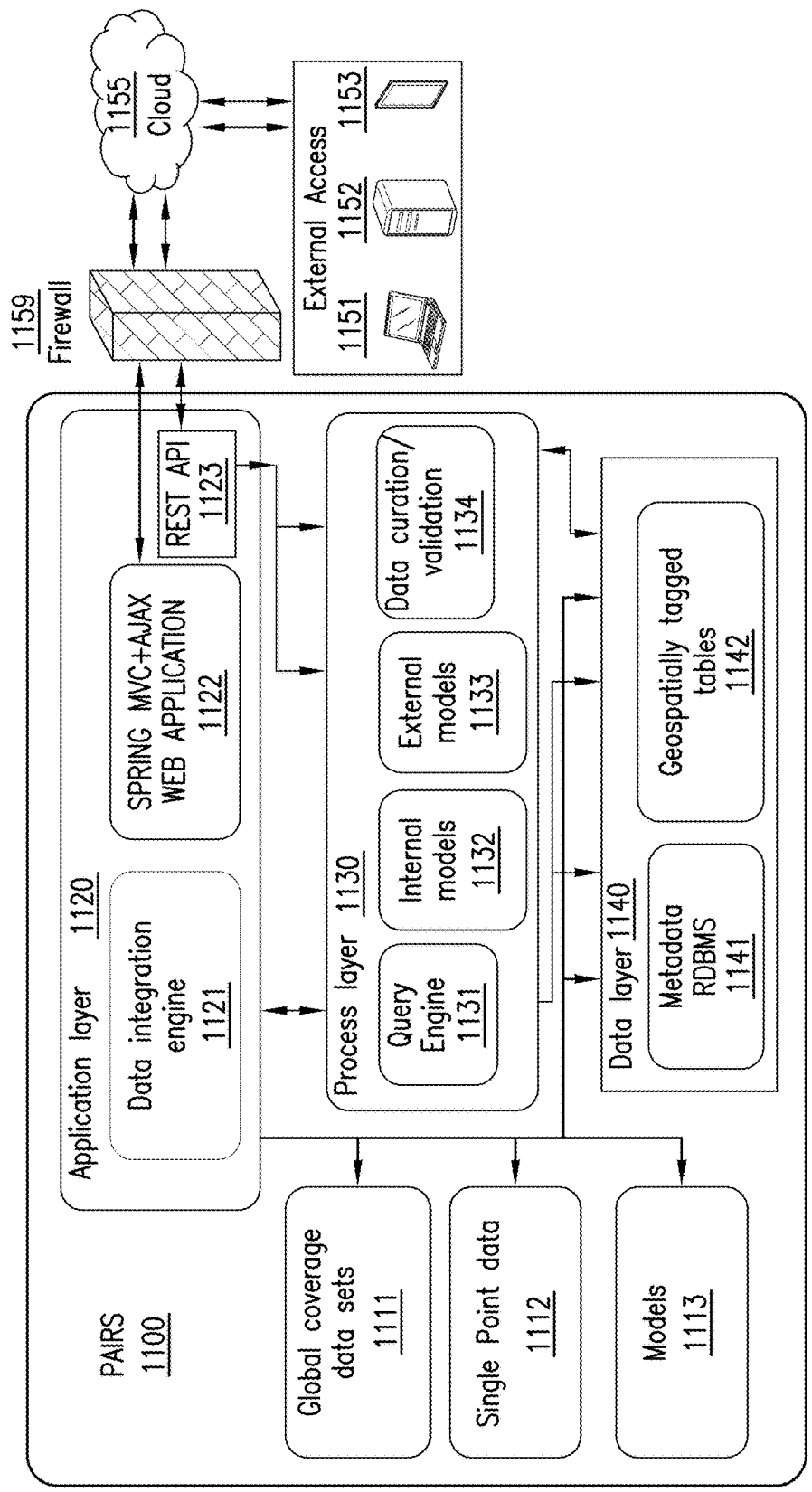
FIG. 11 shows a further combined block diagram and flow chart, according to an aspect of the invention.

FIG. 11 shows another combined block diagram and flow chart, according to an aspect of the invention. Broadly speaking, the PAIRS system 1100 shown in FIG. 11 includes application layer 1120, process layer 1130, and data layer 1140. Within application layer 1120, data integration engine 1121 obtains and integrates data from one or more sources such as global coverage data sets 1111, single point data 1112, and/or models 1113.

Global coverage data sets 1111 may include, e.g., satellite, weather, and/or climate data. Single point data 1112 may include, e.g., GPS location, Twitter® posts, text messages, and/or pictures from cell phones. Models 1113 may include, e.g., hydrological models, risk models, and/or supply chain models.

In addition to sources 1111, 1112 and 1113, data integration engine 1121 may also obtain data from components within data layer 1140, such as RDBMS 1141 and geospatially-tagged tables 1142. Data integration engine 1121 may also be operative to write data to components within data layer 1140, such as metadata RDBMS 1141 and geospatially-tagged tables 1142. The geospatially-tagged tables 1142 may be stored in a non-relational database, such as Hbase®, with the associated metadata being stored in RDBMS 1141, e.g., DB2®.

Applications layer 1120 also includes web application 1122 and application programming interface (API) 1123. API 1123 could be, for example, a RESTful API, while Web application 1122 could include, for example, use of Spring MVC and/or AJAX. Web application 1122 and/or API 1123 could be used to allow for external access by client devices such as, for example, a laptop computer 1151, a desktop computer 1152, and/or a smart phone 1153. This external access could be routed through a network, such as cloud 1161, and a firewall 1162. For example, external access could involve messages (e.g., queries) or data (e.g., published updates) received from cloud 1162 and passed through web application 1122 and/or API 1123 onto process layer 1130.

Process layer 1130 could be implemented at least part using Hadoop® software. Process layer 1130 includes query engine 1131, which can respond to a query at least in part by extracting relevant data sets from data integration engine 1121, RDBMS 1141, and/or geospatially tagged tables 1142. Process layer 1130 may also include internal models 1132, such as machine learning and/or radiative transfer models. Process layer 1130 may further include external models 1133, such as data fusion and data aggregation. Process layer 1130 may additionally include data curation/validation 1133, which can prepare data entered into and/or extracted from geospatially tagged tables 1142.

One skilled in the art will appreciate that, although FIGS. 9 and 11 may be conceptualized as distinct embodiments of the present invention, certain elements within each figure may have certain functional similarities with may assist in creating a single implementation which incorporates features from both embodiments. For example, elements 1111, 1112, and/or 1113 in FIG. 11 could be analogized to elements 905, 911, and/or 915 in FIG. 9. Data integration engine 1121 in FIG. 11 could be analogized to elements 911, 920, and/or 971 in FIG. 9. Process layer 1130 in FIG. 11, especially elements 1132 and/or 1133, could be analogized to elements 915 and/or 920 in FIG. 9. Data curation/validation 1134 could be analogized to elements 930 and/or 940 in FIG. 9. Data layer 1140, especially tables 1142, could also be analogized to element 940 in FIG. 9, while RDBMS 1141 could be analogized to element 945 in FIG. 9. Query engine 1131 could be analogized to element 950 in FIG. 9. API 1123 and web application 1122 in FIG. 11 could be analogized to API 961 and web application 962 in FIG. 9. Elements 1151, 1152, and/or 1153 could be analogized to external access 972 in FIG. 9. Moreover, one skilled in the art will also appreciate that, although 1000 in FIGS. 10 and 1100 in FIG. 11 may be conceptualized as distinct embodiments of the present invention, they also represent different aspects which could be successfully combined in a single embodiment of the invention. More particularly, FIG. 10 could emphasize elements 905, 915, 920, 930 and 940 of FIG. 9, while FIG. 11 could emphasize elements 945, 950, 961, 962, 971 and 972 of FIG. 9, such that one could combine elements of FIGS. 10 and 11 to implement the functionality discussed above with regard to FIG. 9.

One or more embodiments of the invention, or elements thereof, can be implemented, at least in part, in the form of an apparatus including a memory and at least one processor that is coupled to the memory and operative to perform exemplary method steps.

Figure 12:
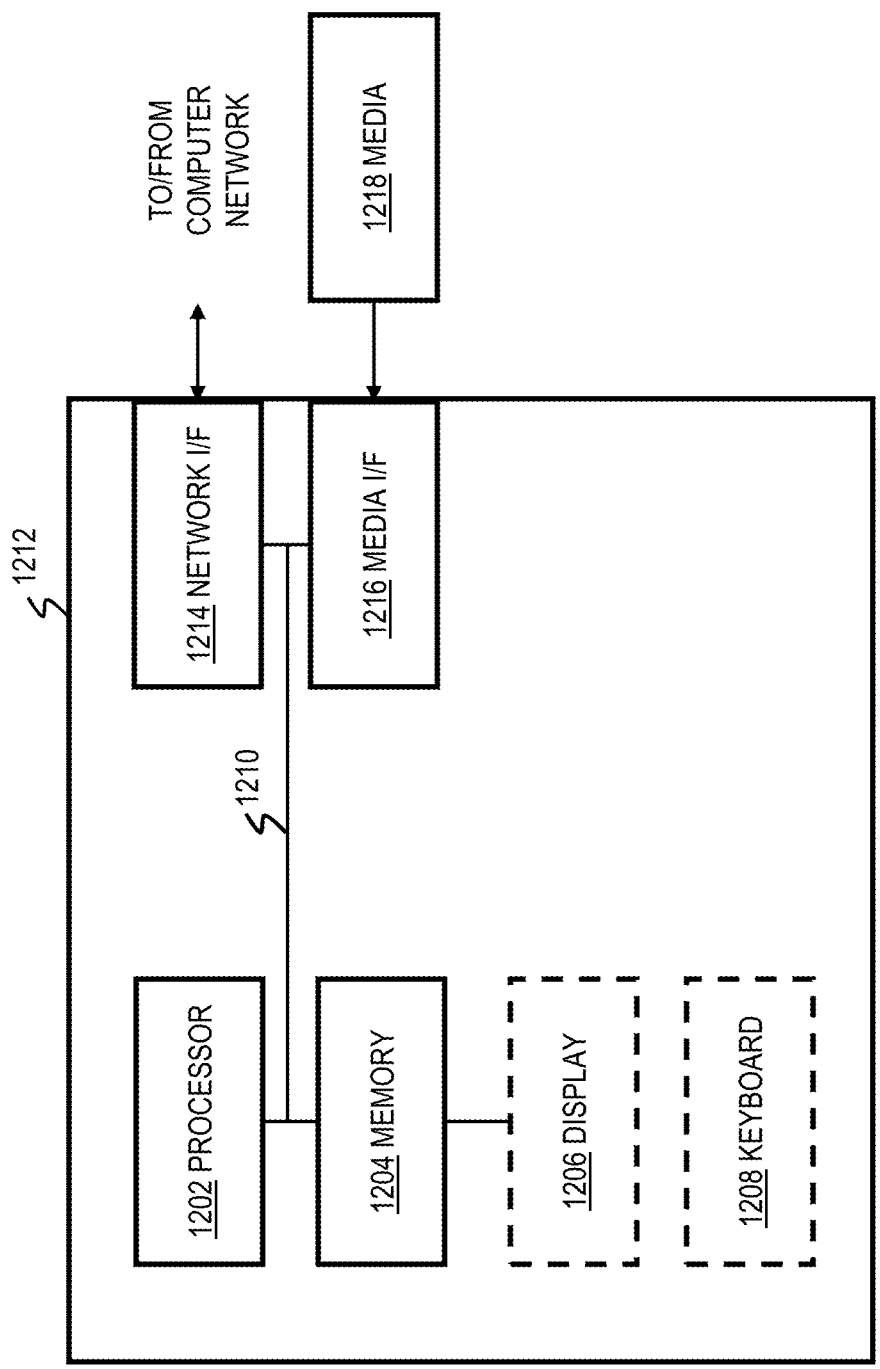
FIG. 12 depicts a computer system that may be useful in implementing one or more aspects and/or elements of the invention.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a di splay and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for accelerating networked parallel searches, the method comprising:
   receiving at least a first geospatial map at a main server from at least one network;
   dividing, using at least one of one or more hardware processors, at least a portion of the first map into a first grid comprising a first plurality of cells with a first resolution;
   dividing, using at least one of the one or more hardware processors, at least the portion of the first map into a second grid comprising a second plurality of cells with a second resolution, wherein the second resolution is a multiple of the first resolution;
   assigning, using at least one of the one or more hardware processors, each of the first plurality of cells and the second plurality of cells a unique key using z-order indexing, wherein key length is inversely proportional to resolution such that keys assigned to each of the second plurality of cells are longer than keys assigned to each of the first plurality of cells;
   determining, using at least one of the one or more hardware processors, that, because an initial portion of a key of a first cell of the second grid comprises a key of a first cell of the first grid, the first cell of the first grid comprises the first cell of the second grid;
   storing the first grid and the second grid in memories of a plurality of distributed servers, wherein the first cell of the first grid and the first cell of the second grid are stored in a same one of the distributed servers or are stored in neighboring ones of the distributed servers;
   receiving a query at the main server from the at least one network; and
   the main server directing respective processors of the plurality of distributed servers to perform a parallel search of the first grid and the second grid using the keys for one or more results responsive to the query.

2. The method of claim 1, wherein at least one corner of at least one of the cells of the second grid is aligned to at least one corner of at least one of the cells of the first grid.

3. The method of claim 1, wherein the first plurality of cells and the second plurality of cells comprise rectangular cells.

4. The method of claim 3, wherein the first plurality of cells and the second plurality of cells comprise square cells.

5. The method of claim 1, wherein each of the first grid and the second grid is based at least in part on longitude and latitude.

6. The method of claim 1, further comprising associating each of the first plurality of cells and the second plurality of cells with a timestamp, wherein each of the first grid and the second grid is based at least in part on the associated timestamp.

7. The method of claim 1, further comprising:
   determining, using the keys, that a second cell of the first grid neighbors a second cell of the second grid; and
   wherein, when storing the first grid and the second grid in respective memories of the plurality of distributed servers, the second cell of the first grid and the second cell of the second grid are stored in a same one of the distributed servers or are stored in neighboring ones of the distributed servers.

8. The method of claim 1, further comprising:
   receiving at least a second geospatial map at the main server from the at least one network;
   dividing at least a portion of the second map into a third grid comprising a third plurality of cells with a third resolution;
   determining that at least a portion of a third cell of the first or second grid overlaps at least a portion of a third cell of the third grid;
   storing the third grid in memories of the plurality of distributed servers, wherein the third cell of the first or second grid and the third cell of the third grid are stored in a same one of the distributed servers or are stored in neighboring ones of the distributed servers;
   responsive to the query, performing a parallel search of the first grid, the second grid, and the third grid for one or more results.

9. The method of claim 8, wherein at least one of the first resolution and the second resolution is equal to the third resolution.

10. The method of claim 8, wherein the third cell of the first or second grid is identical to the third cell of the third grid.

11. The method of claim 8, wherein the first and second maps have different native resolutions.

12. The method of claim 8, further comprising aligning the third plurality of cells with at least one of the first plurality of cells and the second plurality of cells.

13. The method of claim 12, wherein the aligning comprises interpolation to preserve accuracy.

14. The method of claim 13, further comprising selecting the interpolation from a group comprising cubic interpolation, linear interpolation, bilinear interpolation, and nearest-neighbors interpolation.

15. The method of claim 8, further comprising:
   determining that a fourth cell of the third grid neighbors a fourth cell of the first or second grid; and
   wherein, when storing the third grid in memories of the plurality of distributed servers, the third cell of the first or second grid and the third cell of the third grid are stored in a same one of the distributed servers or are stored in neighboring ones of the distributed servers.

16. The method of claim 8, further comprising:
assigning each of the third plurality of cells a key using z-order indexing, wherein the first, second, and third grids share a common coordinate system.

17. The method of claim 1, wherein the one or more results have a specified resolution.

18. The method of claim 17, wherein the specified resolution is included in the query.

19. The method of claim 17, wherein the specified resolution is a native resolution of the first map.

20. The method of claim 17, wherein the specified resolution is an available resolution in a geodatabase.

21. The method of claim 17, wherein the specified resolution is preselected for a given use case.

22. The method of claim 1, wherein a first portion of the one or more results has a different resolution than a second portion of the one or more results.

23. An apparatus, comprising:
a memory; and
at least one processor coupled with the memory and operative:
  to receive at least a first map from at least one network;
  to divide at least a portion of the first map into a first grid comprising a first plurality of cells with a first resolution;
  to divide at least the portion of the first map into a second grid comprising a second plurality of cells with a second resolution, wherein the second resolution is a multiple of the first resolution;
  to assign each of the first plurality of cells and the second plurality of cells a unique key using z-order indexing, wherein key length is inversely proportional to resolution such that keys assigned to each of the second plurality of cells are longer than keys assigned to each of the first plurality of cells;
  to determine that, because an initial portion of a key of a first cell of the second grid comprises a key of a first cell of the first grid, the first cell of the first grid comprises the first cell of the second grid;
  to store the first grid and the second grid in memories of a plurality of distributed servers, wherein the first cell of the first grid and the first cell of the second grid are stored in a same one of the distributed servers or are stored in neighboring ones of the distributed servers;
  to receive a query at the main server from the at least one network; and
  to direct respective processors of the plurality of distributed servers to perform a parallel search of the first grid and the second grid using the keys for one or more results responsive to the query.

24. A computer program product comprising a non-transitory machine-readable storage medium having machine-readable program code embodied therewith, said machine-readable program code comprising:
machine-readable program code configured:
  to receive at least a first map from at least one network;
  to divide at least a portion of the first map into a first grid comprising a first plurality of cells with a first resolution;
  to divide at least the portion of the first map into a second grid comprising a second plurality of cells with a second resolution, wherein the second resolution is a multiple of the first resolution;
  to assign each of the first plurality of cells and the second plurality of cells a unique key using z-order indexing, wherein key length is inversely proportional to resolution such that keys assigned to each of the second plurality of cells are longer than keys assigned to each of the first plurality of cells;
  to determine that, because an initial portion of a key of a first cell of the second grid comprises a key of a first cell of the first grid, the first cell of the first grid comprises the first cell of the second grid;
  to store the first grid and the second grid in memories of a plurality of distributed servers, wherein the first cell of the first grid and the first cell of the second grid are stored in a same one of the distributed servers or are stored in neighboring ones of the distributed servers;
  to receive a query at the main server from the at least one network; and
  to direct respective processors of the plurality of distributed servers to perform a parallel search of the first grid and the second grid using the keys for one or more results responsive to the query.

* * * * *